United States Patent
Wu et al.

(10) Patent No.: US 12,129,380 B2
(45) Date of Patent: Oct. 29, 2024

(54) WATER DISPERSIBLE SUPPORT MATERIALS FOR 3D PRINTING

(71) Applicant: 3D Systems, Incorporated, Rock Hill, SC (US)

(72) Inventors: Bo Wu, Wilsonville, NC (US); Jule W Thomas, Jr., West Linn, NC (US)

(73) Assignee: 3D SYSTEMS, INC., Rock Hill, SC (US)

( * ) Notice: Subject to any disclaimer, the term of this patent is extended or adjusted under 35 U.S.C. 154(b) by 394 days.

(21) Appl. No.: 16/658,356

(22) Filed: Oct. 21, 2019

(65) Prior Publication Data

US 2020/0071529 A1  Mar. 5, 2020

Related U.S. Application Data

(62) Division of application No. 14/725,005, filed on May 29, 2015, now abandoned.

(60) Provisional application No. 62/005,210, filed on May 30, 2014.

(51) Int. Cl.
| | |
|---|---|
| C08L 91/06 | (2006.01) |
| B29C 64/00 | (2017.01) |
| B29C 64/40 | (2017.01) |
| B29K 91/00 | (2006.01) |
| B33Y 10/00 | (2015.01) |
| B33Y 40/20 | (2020.01) |
| B33Y 70/00 | (2020.01) |
| C08L 23/06 | (2006.01) |

(52) U.S. Cl.
CPC .............. *C08L 91/06* (2013.01); *B29C 64/00* (2017.08); *B29C 64/40* (2017.08); *B33Y 10/00* (2014.12); *B33Y 40/20* (2020.01); *B33Y 70/00* (2014.12); *C08L 23/06* (2013.01); *B29K 2023/06* (2013.01); *B29K 2091/00* (2013.01)

(58) Field of Classification Search
CPC ................ B29C 64/40; B29K 2023/06; B29K 2091/00; B33Y 10/00; B33Y 40/00; B33Y 70/00; C08L 23/06; C08L 91/06
See application file for complete search history.

(56) References Cited

U.S. PATENT DOCUMENTS

| | | | |
|---|---|---|---|
| 6,133,353 A | 10/2000 | Bui et al. | |
| 6,395,811 B1 | 5/2002 | Nguyen et al. | |
| 6,437,034 B2* | 8/2002 | Lombardi | C08L 53/00 524/425 |
| 6,528,613 B1 | 3/2003 | Bui et al. | |
| 6,841,589 B2 | 1/2005 | Schmidt et al. | |
| 7,176,253 B2 | 2/2007 | Xu et al. | |
| 7,378,460 B2 | 5/2008 | Schmidt et al. | |
| 7,399,796 B2 | 7/2008 | Xu et al. | |
| 8,167,395 B2 | 5/2012 | Flenup et al. | |
| 8,575,258 B2 | 11/2013 | Stockwell et al. | |
| 8,642,692 B1 | 2/2014 | Stockwell et al. | |
| 8,975,352 B2 | 3/2015 | Stockwell et al. | |
| 2004/0242728 A1* | 12/2004 | Xu | C09D 11/00 523/160 |
| 2008/0252682 A1 | 10/2008 | Hernandez et al. | |
| 2011/0262711 A1* | 10/2011 | Chopra | B33Y 70/00 428/172 |
| 2012/0213976 A1* | 8/2012 | Xu | C08L 91/06 428/195.1 |
| 2015/0344694 A1 | 12/2015 | Wu et al. | |

FOREIGN PATENT DOCUMENTS

| | | |
|---|---|---|
| JP | 2001-214098 | 8/2001 |
| JP | 2005-504860 | 2/2005 |
| JP | 2005-508404 | 3/2005 |
| JP | 2012-526687 | 11/2012 |
| JP | 2013-047003 | 3/2013 |
| JP | 2015-081380 | 4/2015 |
| JP | 6391713 | 9/2018 |
| WO | 2012/116047 | 8/2012 |
| WO | 20150138580 | 9/2015 |

OTHER PUBLICATIONS

English Translation of Japan's First Office Action for Japanese Patent Application No. 2016-568382 dated Nov. 30, 2017 (3 pages).
PCT International Search Report for the International Searching Authority for PCT/US2015/033110, mailed Sep. 2, 2015 (4 pages).
PCT Written Opinion of the International Searching Authority for PCT/US2015/033110, mailed Sep. 2, 2015 (4 pages).
English Translation of Japan's First Office Action for Japanese Patent Application No. 2018-154366 dated Aug. 1, 2019 (4 pages).

\* cited by examiner

*Primary Examiner* — James M Mellott
(74) *Attorney, Agent, or Firm* — Maynard Nexsen PC; John P. Zimmer; Nicholas P. Stadnyk

(57) ABSTRACT

Water dispersible support materials for use with a three-dimensional printing system are described herein. In some embodiments, a support material described herein comprises a phase change wax component and an ethoxylated polyethylene having the formula $H-(CH_2)_m-(OCH_2CH_2)_n-OH$, wherein m is an integer from 22 to 60 and n is an integer from 2 to 200. In some cases, the phase change wax component and the ethoxylated polyethylene are each present in the support material in an amount of 20-80% by weight.

22 Claims, No Drawings

WATER DISPERSIBLE SUPPORT MATERIALS FOR 3D PRINTING

CROSS REFERENCE TO RELATED APPLICATIONS

This application is a divisional application of U.S. patent application Ser. No. 14/725,005, filed May 29, 2015, which claims priority pursuant to 35 U.S.C. § 119 to U.S. Provisional Patent Application Ser. No. 62/005,210, filed on May 30, 2014, each of which is hereby incorporated by reference in its entirety.

FIELD

The invention relates to support materials and, in particular, to water dispersible support materials for use with three-dimensional (3D) printing systems.

BACKGROUND

Commercially available 3D printers, such as the ProJet™ 3D Printers manufactured by 3D Systems of Rock Hill, South Carolina, use inks, which are also known as build materials, that are jetted through a print head as a liquid to form various 3D objects or parts. Other 3D printing systems also use an ink or build material that is jetted through a print head. In some instances, the build material is solid at ambient temperatures and converts to liquid at elevated jetting temperatures. In other instances, the build material is liquid at ambient temperatures.

Moreover, production of a 3D part in a 3D printing system often requires the use of a support material in conjunction with the build material. The support material is also jetted through a print head as a liquid and then subsequently solidified. However, unlike the build material, the support material is subsequently removed to provide the finished 3D part.

Removal of the support material can be administered through several processes, including heating the support material to a temperature above its melting point in conjunction with the use of a suitable organic carrier to sufficiently remove the support material from the build material. In some cases, the organic carrier deposits an undesirable oily residue on the completed 3D part. Furthermore, the use of elevated temperatures in addition to a suitable organic carrier, in some situations, can compromise the mechanical integrity of the finished 3D part resulting in part deformation or failure. In other cases, a soap or detergent may be used to remove the support material from a 3D part, including at elevated temperatures.

Therefore, there exists a need for improved support materials for 3D printing, including support materials that can be removed in a more facile manner.

SUMMARY

In one aspect, support materials for use with a 3D printer are described herein which, in some embodiments, may offer one or more advantages over prior support materials. In some embodiments, for example, a support material described herein provides good adhesion to a build material and/or a print pad or other 3D printing substrate. A support material described herein can also be water dispersible or water soluble, including at room temperature or near room temperature. Further, in some cases, a support material described herein can be removed from a finished part without the use of a soap or detergent.

In some embodiments, a support material for use in a 3D printing system described herein comprises a phase change wax component and an ethoxylated polyethylene having the formula H—$(CH_2)_m$—$(OCH_2CH_2)_n$—OH, wherein m is an integer from 22 to 60 or from 30 to 40, and n is an integer from 2 to 200 or from 10 to 100. In some cases, the phase change wax component and the ethoxylated polyethylene are each present in the support material in an amount of about 20-80% by weight or 40-60% by weight, based on the total weight of the support material. Further, in some instances, the phase change wax component of a support material described herein comprises a ketone wax, an ester wax, an alcohol wax, an amide wax, a urethane wax, or a mixture or combination thereof. Additionally, in some embodiments, a support material described herein further comprises about 2-30% by weight tackifier, based on the total weight of the support material. The tackifier, in some cases, can comprise a rosin ester, a rosin alcohol, or a mixture or combination thereof. Moreover, in some instances, a support material described herein further comprises up to about 10% by weight inhibitor and/or stabilizing agent. In addition, in some embodiments, a support material described herein can be non-curable.

In another aspect, compositions are described herein. In some cases, a composition described herein comprises a three-dimensionally printed article comprising a build material and a support material, the support material comprising a support material described above. For example, in some cases, the support material comprises a phase change wax component and an ethoxylated polyethylene having the formula H—$(CH_2)_m$—$(OCH_2CH_2)_n$—OH, wherein m and n are integers having the values described above.

In yet another aspect, methods of printing a 3D article are described herein. A method of printing a 3D article described herein, in some embodiments, comprises selectively depositing layers of a fluid build material to form the 3D article on a substrate and supporting at least one of the layers of the build material with a support material, the support material comprising a support material described above. In some cases, for instance, the support material comprises a wax component and an ethoxylated polyethylene having the formula H—$(CH_2)_m$—$(OCH_2CH_2)_n$—OH, wherein m is an integer from 22 to 60 and n is an integer from 2 to 200. Further, in some embodiments, the layers of the build material are deposited according to an image of the 3D article in a computer readable format, such as a computer aided design (CAD) format. Additionally, in some cases, a method described herein further comprises curing the build material. Moreover, in some embodiments, a method described herein further comprises removing the support material from the build material by contacting the support material with water, including water at or near room temperature.

These and other embodiments are described in greater detail in the detailed description which follows.

DETAILED DESCRIPTION

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The terms "three-dimensional printing system," "three-dimensional printer," "printing," and the like generally describe various solid freeform fabrication techniques for making three-dimensional articles or objects by selective deposition, jetting, fused deposition modeling, multijet modeling, and other techniques now known in the art or that may be known in the future that use a build material or ink to fabricate three-dimensional objects, parts, or articles.

I. Support Materials

In one aspect, support materials for use with a 3D printing system are described herein. In some embodiments, a support material described herein comprises a phase change wax component and an ethoxylated polyethylene having the formula H—$(CH_2)_m$—$(OCH_2CH_2)_n$—OH, wherein m is an integer from 22 to 60 and n is an integer from 2 to 200. In some cases, a support material described herein further comprises a tackifier. Additionally, in some embodiments, a support material described herein further comprises an inhibitor and/or a stabilizing agent.

Turning now to specific components of support materials, a support material described herein comprises a phase change wax component. A phase change wax component, in some embodiments, is operable to assist or accelerate the solidification of the support material when the support material is cooled to or below the freezing point of the material. In some cases, a phase change wax component has a sharp freezing point or a freezing point over a narrow range of temperatures. In some embodiments, for example, a phase change wax component freezes or solidifies over a temperature range of about 1° C. to about 5° C. or about 1° C. to about 3° C. In some cases, a phase change wax component having a sharp freezing point freezes or solidifies over a temperature range of X±0.5° C., where X is the temperature at which the freezing point is centered (e.g., X=45° C.).

Any phase change wax component not inconsistent with the objectives of the present disclosure may be used in a support material described herein. In some embodiments, a phase change wax component of a support material described herein comprises a ketone wax, an ester wax, an alcohol wax, an amide wax, a urethane wax, or a mixture or combination thereof.

A ketone wax, in some cases, comprises an alkyl alkyl ketone, an alkyl aryl ketone, an aryl aryl ketone, an aryl arylalkyl ketone, an aryl alkylaryl ketone, an arylalkyl arylalkyl ketone, an arylalkyl alkylaryl ketone, an alkylaryl alkylaryl ketone, or a combination or mixture of two or more of the foregoing. For example, in some embodiments, a ketone wax of a phase change wax component described herein comprises an alkyl alkyl ketone having the general formula R—(C═O)—R', wherein R and R' are each independently an alkyl group having between 1 and 36 carbon atoms, provided that at least one of R and R' is an alkyl group having at least 4 carbon atoms. In some cases, such an alkyl group is linear. An alkyl group of a ketone wax described herein can also be branched, cyclic, saturated, unsaturated, substituted, or unsubstituted. Non-limiting examples of alkyl alkyl ketones suitable for use in some embodiments of support materials described herein include n-octyl-n-propyl ketone; n-octyl-n-butyl ketone, n-decyl-n-ethyl ketone, n-undecyl-n-propyl ketone, n-dodecyl-n-ethyl ketone, di-n-hexylketone, di-n-heptylketone, di-n-octyl ketone, di-n-nonyl ketone, di-n-decyl ketone, di-n-undecyl ketone, di-n-tridecyl ketone, di-n-heptadecyl ketone, di-n-octadecyl ketone, and mixtures or combinations thereof. Other alkyl alkyl ketones may also be used.

Further, a ketone wax of a phase change wax component described herein can also comprise an alkyl aryl ketone having the general formula R—(C═O)—Ar, wherein R is an alkyl group as described above for an alkyl alkyl ketone, and Ar is an aryl group having 6 to 36 carbon atoms. The aryl group, in some cases, comprises a substituted or unsubstituted phenyl, naphthyl, or anthryl group. Non-limiting examples of alkyl aryl ketones suitable for use in some embodiments of support materials described herein include n-octyl phenyl ketone, n-undecyl phenyl ketone, n-pentadecyl phenyl ketone, n-octadecyl phenyl ketone, and mixtures or combinations thereof. Other alkyl aryl ketones may also be used.

In addition, in some embodiments, a ketone wax of a phase change wax component described herein comprises an aryl aryl ketone having the general formula Ar—(C═O)—Ar', wherein Ar and Ar' are each independently an aryl group described above for alkyl aryl ketones. Non-limiting examples of aryl aryl ketones suitable for use in some embodiments of support materials described herein include diphenyl acetone, 2-naphthyl phenyl ketone, and mixtures or combinations thereof. Other aryl aryl ketones may also be used.

Moreover, a ketone wax of a phase change wax component described herein can also comprise an aryl arylalkyl ketone or an aryl alkylaryl ketone having the general formula Ar—(C═O)—Ar'R or Ar—(C═O)—RAr', wherein R is an alkyl group described hereinabove for an alkyl alkyl ketone, and Ar and Ar' are each independently an aryl group described hereinabove for an aryl aryl ketone. One non-limiting example of an aryl alkylaryl ketone suitable for use in some embodiments of support materials described herein is benzyl phenyl ketone. Other aryl arylalkyl ketones or aryl alkylaryl ketones may also be used.

In addition, in some embodiments, a ketone wax of a phase change wax component described herein comprises an arylalkyl arylalkyl ketone, an arylalkyl alkylaryl ketone, or an alkylaryl alkylaryl ketone having the general formula RAr—(C═O)—Ar'R, RAr—(C═O)—R'Ar', or ArR—(C═O)—R'Ar', wherein Ar and Ar' are each independently an aryl group described above and R and R' are each independently an alkyl group described above. One non-limiting example of such a ketone is di-n-benzyl ketone. Other such ketones may also be used.

Moreover, when a ketone wax described herein comprises a substituted alkyl, aryl, alkylaryl, or arylalkyl group, one or more substituents of the substituted group, in some cases, can comprise a hydroxy group, amine group, imine group, ammonium group, pyridine group, pyridinium group, ether group, ester group, amide group, carbonyl group, thiocarbonyl group, sulfate group, sulfonate group, sulfide group, sulfoxide group, phosphine group, phosphonium group, phosphate group, mercapto group, nitroso group, sulfone group, acyl group, acid anhydride group, or azide group.

Additional examples of ketone waxes suitable for use in some embodiments of support materials described herein include stearones such as T-1 (Kao Corporation); KLB-766 (C21-(C=O)—C21 ketone) (Kao Corporation); and KLB-770 (C17-(C=O)—C17 ketone) (Kao Corporation), and/or laurones such as LAURONE (Kanto Kagaku Co. Ltd.).

An ester wax, in some embodiments, comprises an alkyl alkyl ester, an alkyl aryl ester, an aryl aryl ester, an aryl arylalkyl ester, an aryl alkylaryl ester, an arylalkyl arylalkyl ester, an arylalkyl alkylaryl ester, an alkylaryl alkylaryl ester, or a combination or mixture of two or more of the foregoing. For example, in some cases, an ester wax of a phase change wax component described herein comprises an ester having the general formula R—(C=O)—OR', wherein R and R' are each independently an alkyl group described hereinabove for ketone waxes, such as an alkyl group having between 1 and 36 carbon atoms, provided that at least one of R and R' is an alkyl group having at least 4 carbon atoms. In some cases, such an alkyl group is linear. An alkyl group of an ester wax described herein can also be branched, cyclic, saturated, unsaturated, substituted, or unsubstituted. An ester wax can also have the general formula R—(C=O)—OAr, RO—(C=O)—Ar, Ar—(C=O)—OAr', ArO—(C=O)—RAC, Ar—(C=O)—ORAr', ArO—(C=O)—Ar'R, Ar—(C=O)—OAr'R, ArR—(C=O)—OAr'R, ArR—(C=O)—OR'Ar', or RAr—(C=O)—OR'Ar', wherein Ar and Ar' are each independently an aryl group described above and R and R' are each independently an alkyl group described above. For example, in some embodiments, Ar and Ar' are each an aryl group having 6 to 36 carbon atoms. One non-limiting example of an ester wax suitable for use in some embodiments described herein is methyl behenate ($CH_3O$—(C=O)—$CH_2(CH_2)_{20}CH_3$). Other ester waxes may also be used.

Moreover, when an ester wax described herein comprises a substituted alkyl, aryl, alkylaryl, or arylalkyl group, one or more substituents of the substituted group, in some cases, can comprise a substituent group described hereinabove for substituted ketone waxes.

An alcohol wax, in some instances, comprises a fatty alcohol. Any fatty alcohol not inconsistent with the objectives of the present disclosure may be used. In some cases, a fatty alcohol has the general formula $C_nH_{2n+1}OH$, wherein n is an integer from 6 to 36 or from 8 to 28. In some embodiments, for example, a fatty alcohol comprises decanol ($C_{10}H_{21}OH$), dodecanol ($C_{12}H_{25}OH$), tetradecanol ($C_{14}H_{29}OH$), hexadecanol ($C_{16}H_{33}OH$), octadecanol ($C_{18}H_{37}OH$), eicosanol ($C_{20}H_{41}OH$) or docosanol ($C_{22}H_{45}OH$), or a mixture or combination thereof. Further, a fatty alcohol described herein, in some cases, can be a primary alcohol such as stearyl alcohol or behenyl alcohol. Other fatty alcohols may also be used.

Further, an alcohol wax described herein can also comprise a synthetic long chain alcohol or a hydroxyl-terminated hydrophobic polymer, such as a hydroxyl-terminated polyethylene. For example, in some cases, an alcohol wax described herein comprises UNILIN 350, UNILIN 425, UNILIN 550, and/or UNILIN 700.

An amide wax, in some embodiments, comprises an alkyl alkyl amide or bis(amide), an alkyl aryl amide or bis(amide), an aryl aryl amide or bis(amide), an aryl arylalkyl amide or bis(amide), an aryl alkylaryl amide or bis(amide), an arylalkyl arylalkyl amide or bis(amide), an arylalkyl alkylaryl amide or bis(amide), an alkylaryl alkylaryl amide or bis(amide), or a combination or mixture of two or more of the foregoing. For example, in some cases, an amide wax of a phase change wax component described herein comprises ethylene bis(stearamide) (EBS). In other cases, an amide has the general formula R—(C=O)—NHR', wherein R and R' are each independently an alkyl group described hereinabove, such as an alkyl group having between 1 and 36 carbon atoms, provided that at least one of R and R' is an alkyl group having at least 4 carbon atoms. In some cases, such an alkyl group is linear. An alkyl group of an amide wax described herein can also be branched, cyclic, saturated, unsaturated, substituted, or unsubstituted. An amide wax can also have the general formula R—(C=O)—NR"Ar, RNR"—(C=O)—Ar, Ar—(C=O)—NR"Ar', ArNR"—(C=O)—RAr', Ar—(C=O)—NR"RAr', ArNR"—(C=O)—Ar'R, Ar—(C=O)—NR"Ar'R, ArR—(C=O)—NR"Ar'R, ArR—(C=O)—NR"R'Ar', or RAr—(C=O)—NR"R'Ar', wherein Ar and Ar' are each independently an aryl group described above, R and R' are each independently an alkyl group described above, and R" is hydrogen or an alkyl group described above. For example, in some embodiments, Ar and Ar' are each an aryl group having 6 to 36 carbon atoms. One non-limiting example of an amide wax suitable for use in some embodiments described herein is stearyl stearamide ($CH_3(CH_2)_{17}$—(C=O)—$NH(CH_2)_{17}CH_3$). Other amide waxes may also be used.

A urethane wax, in some embodiments, is selected from a class of inert linear urethane waxes having the general chemical formula $C_{18}H_{37}NRCOOC_xH_{(2x-1)}$ wherein x is an integer from 4 to 16 or 4 to 22, and R is H or C1-C20 alkyl. In some cases, R is H. In some embodiments, R is C1-C6 alkyl, C1-C10 alkyl, or C1-C20 alkyl. Alternatively, in other cases, a urethane wax is selected from a class of reactive linear urethane waxes having the formula $C_xH_{(2x-1)}NRC(O)OC_yH_{2y}OC(O)C(CH_3)=CH_2$ wherein x is an integer from 12 to 18, y is an integer from 2 to 12, and R is H or C1-C20 alkyl. In some embodiments, R is H. In other cases, R is C1-C6 alkyl, C1-C10 alkyl, or C1-C20 alkyl. Non-limiting examples of urethane waxes suitable for use in some embodiments of support materials described herein include 1-dodecyl-N-octadecyl carbamate ($CH_3(CH_2)_{17}NHCOO(CH_2)_{11}CH_3$) and 1-hexadecyl-N-octadecyl carbamate ($CH_3(CH_2)_{17}NHCOO(CH_2)_{15}CH_3$). Other urethane waxes may also be used.

The chemical composition of a phase change wax component of a support material described herein can be selected based on one or more desired properties of the phase change wax component and/or the support material comprising the phase change wax component. For example, in some cases, the chemical composition of a phase change wax component is selected such that the phase change wax component has a melting point centered from 40° C. to 110° C. or from 60° C. to 90° C. at a pressure of 1 atm. In other instances, the chemical composition of a phase change wax component is selected such that the phase change wax component is miscible with an ethoxylated polyethylene of the support material, as described further hereinbelow.

Further, a phase change wax component of a support material described herein can be present in the support material in any amount not inconsistent with the objectives of the present disclosure. In some cases, for instance, the phase change wax component is present in an amount of 20-80% by weight, 30-70% by weight, 40-60% by weight, or 45-55% by weight, based on the total weight of the support material.

Support materials described herein also comprise an ethoxylated polyethylene component, the ethoxylated polyethylene having the formula $H-(CH_2)_m-(OCH_2CH_2)_n-OH$, wherein m is an integer from 22 to 60 and n is an integer from 2 to 200. In some cases, m is an integer from 30 to 40 and/or n is an integer from 10 to 100 or from 60 to 90. Selecting such values of m and n, in some embodiments, can permit miscibility or other chemical or physical compatibility of the ethoxylated polyethylene with one or more other components of the support material, such as one or more phase change wax components of the support material.

For example, in some cases, the ethoxylated polyethylene of a support material described herein is miscible with at least two of, at least three of, or at least four of a ketone wax, an ester wax, an alcohol wax, and an amide wax at a temperature of 70-95° C. and a pressure of 1 atm. In some embodiments, the ethoxylated polyethylene and the phase change wax component of a support material described herein are miscible at a temperature of 70-95° C. and a pressure of 1 atm. Materials that are "miscible" with one another can form a single phase when mixed, as opposed to forming a plurality of separate phases.

Non-limiting examples of ethoxylated polyethylenes suitable for use in some embodiments of support materials described herein include UNITHOX 450, UNITHOX 480, UNITHOX 550, and UNITHOX 750.

Further, an ethoxylated polyethylene can be present in a support material described herein in any amount not inconsistent with the objectives of the present disclosure. In some cases, for instance, the ethoxylated polyethylene is present in an amount of 20-80% by weight, 30-70% by weight, 40-60% by weight, or 45-55% by weight, based on the total weight of the support material.

Moreover, in some instances, an ethoxylated polyethylene described herein can be at least partially replaced in a support material with one or more other species, such as one or more water dispersible or water soluble polymers other than an ethoxylated polyethylene. In some embodiments, for instance, an ethoxylated polyethylene is at least partially replaced by a polyethylene glycol (PEG). Further, a "water dispersible" polymer, in some cases, can comprise any hydrophilic or amphiphilic polymer that can be dispersed in water, including water at a temperature at or near room temperature (25° C.), such as a temperature of 20-30° C.

A support material described herein, in some embodiments, further comprises a tackifier. The inclusion of a "tackifier," in some cases, can increase the adhesiveness of the support material to a printing substrate and/or a build material, as described further hereinbelow. Any tackifier not inconsistent with the objectives of the present disclosure may be used. In some embodiments, for instance, a tackifier comprises a rosin ester, a rosin alcohol, or a mixture or combination thereof. Any rosin ester or rosin alcohol not inconsistent with the objectives of the present disclosure may be used.

In some embodiments, a rosin ester comprises the reaction product of an alcohol with a rosin acid. The alcohol, in some embodiments, comprises methanol, glycerol, diethylene glycol, triethylene glycol, and/or pentaerythritol. The rosin acid, in some cases, comprises one or more of abietic acid, neoabietic acid, dehydroabietic acid, palustric acid, pimaric acid, isopimaric acid, levopimaric acid, and sandaracopimaric acid. Further, in some instances, a rosin ester is at least partially hydrogenated.

A rosin alcohol, in some embodiments, comprises the reaction product of the hydrogenation of one or more rosin acids, including rosin acids described hereinabove. Further, in some cases, a rosin alcohol comprises a primary alcohol, such as hydroabietyl alcohol.

A tackifier can be present in a support material described herein in any amount not inconsistent with the objectives of the present disclosure. In some cases, for instance, a tackifier is present in an amount of 2-30% by weight, 5-25% by weight, or 10-20% by weight, based on the total weight of the support material.

A support material described herein, in some embodiments, further comprises an inhibitor or stabilizing agent. An inhibitor or stabilizing agent, in some cases, can prevent or inhibit the polymerization, oxidation, or other reaction or degradation of one or more components of a support material described herein. Any inhibitor or stabilizing agent not inconsistent with the objectives of the present disclosure may be used. In some instances, an inhibitor or stabilizing agent comprises one or more anti-oxidants. In some cases, for example, an inhibitor or stabilizing agent comprises an aryl compound such as butylated hydroxytoluene (BHT). Other inhibitors or stabilizing agents may also be used.

An inhibitor or stabilizing agent can be present in a support material described herein in any amount not inconsistent with the objectives of the present disclosure. In some embodiments, an inhibitor or stabilizing agent is present in a support material in an amount up to about 10% by weight or up to about 5% by weight, based on the total weight of the support material. In some cases, an inhibitor or stabilizing agent is present in a support material in an amount ranging from about 0.1% by weight to about 10% by weight, from about 0.1% by weight to about 5% by weight, or from about 0.5% by weight to about 4% by weight, based on the total weight of the support material.

Support materials having a composition described herein can be water dispersible or water soluble. A "water dispersible" support material, in some cases, can be completely or substantially completely dispersed in water within 18 hours or less, within 8 hours or less, within 2 hours or less, within 1 hour or less, within 30 minutes or less, within 15 minutes or less, within 5 minutes or less, within 3 minutes or less, within 2 minutes or less, or within 1 minute or less when immersed in water, with or without agitation of the water. A support material that is "substantially dispersed" in water, in some embodiments, is present in the water as solvated chemical species and/or as colloidal or suspended particles in an amount of at least about 80% by weight, at least about 90% by weight, at least about 95% by weight, or at least about 99% by weight, based on the total weight of the support material. Moreover, in some embodiments, the water is at a temperature of 20-30° C., such as a temperature of 25° C.

Moreover, in some embodiments, a support material described herein is self-emulsifying when contacted with water or a continuous aqueous phase. Additionally, in some cases, an aqueous dispersion of a support material described herein can be directly disposed of in a wastewater treatment system without further chemical and/or physical processing prior to entry into the wastewater treatment system. In some instances, for example, an aqueous dispersion of a support material described herein can be disposed of in a municipal wastewater treatment system without further chemical and/or physical processing or treatment prior to entry into the municipal wastewater treatment system. Additionally, in some cases, a support material described herein is biodegradable.

Further, support materials described herein, in some embodiments, can have a melting point or freezing point consistent with the temperature parameters of one or more 3D printing systems. In some cases, a support material has a melting point ranging from about 45° C. to about 95° C., from about 45° C. to about 70° C., from about 50° C. to about 65° C., from about 55° C. to about 63° C., or from about 60° C. to about 62° C. Moreover, in some embodiments, a support material described herein has a freezing point ranging from about 45° C. to about 55° C., from about 47° C. to about 52° C., or from about 49° C. to about 51° C.

Further, in some instances, a support material described herein has a viscosity consistent with the requirements and parameters of one or more 3D printing systems. In some cases, for example, a support material described herein has a viscosity ranging from about 9.0 centipoise (cP) to about 14.0 cP at a temperature of about 65° C., when measured according to ASTM standard D2983 (e.g., using a Brookfield Model DV-II+ Viscometer). In some embodiments, a support material has a viscosity ranging from about 9.5 cP to about 12.0 cP or from about 10.0 cP to 11.0 cP at a temperature of about 65° C. In other cases, a support material described herein has a viscosity ranging from about 10.0 cP to about 19.0 cP, from about 11.0 cP to about 14.0 cP, from about 11.5 cP to about 13.5 cP, or from about 12.0 cP to about 13.0 cP at a temperature of about 80° C.

Moreover, in some embodiments, a support material described herein is non-curable or does not polymerize or substantially polymerize when irradiated with electromagnetic radiation used in free radical polymerizations. In some cases, a support material described herein does not comprise a chemical species having one or more ethyleneically unsaturated moieties, such as one or more acrylate, methacrylate, or vinyl species. In some embodiments, such a chemical species is present in a support material described herein in an amount of no greater than about 5% by weight, no greater than about 1% by weight, no greater than about 0.5% by weight, or no greater than about 0.1% by weight, based on the total weight of the support material.

The various components of a support material described herein can be combined or mixed in any ratio not inconsistent with the objectives of the present disclosure. General guidelines for establishing a suitable ratio of components can include maintaining the water dispersibility of the support material while providing sufficient mechanical integrity to the support material for use in 3D printing systems, or providing a desired viscosity of the support material for one or more specific jetting temperatures or deposition rates of a 3D printing system.

Support materials described herein can be made in any manner not inconsistent with the objectives of the present disclosure. In some cases, for instance, a method for the preparation of a support material described herein comprises the steps of mixing the components of the support material, melting the mixture, and filtering the molten mixture. Melting the mixture, in some embodiments, is carried out at a temperature of about 55° C. or in a range from about 40° C. to about 110° C. In some embodiments, a support material described herein is produced by placing all components of the support material in a reaction vessel and heating the resulting mixture to a temperature ranging from about 40° C. to about 110° C. with stirring. The heating and stirring are continued until the mixture attains a substantially homogenized molten state. In general, the molten mixture can be filtered while in a flowable state to remove any large undesirable particles that may interfere with jetting.

II. Compositions

In another aspect, compositions are described herein. In some embodiments, a composition comprises a three-dimensionally printed article comprising a build material and a support material, wherein the support material comprises a support material described hereinabove in Section I. Any support material described in Section I may be used in a composition described herein. For example, in some cases, the support material comprises a wax component and an ethoxylated polyethylene having the formula H—$(CH_2)_m$—$(OCH_2CH_2)_n$—OH, wherein m is an integer from 22 to 60 or from 30 to 40, and n is an integer from 2 to 200 or from 10 to 100. Additionally, in some cases, the phase change wax component and the ethyoxylated polyethylene are each present in the support material in an amount of 20-80% by weight or 40-60% by weight, based on the total weight of the support material. Moreover, in some embodiments, the support material of a composition described herein further comprises a tackifier such as a rosin ester, a rosin alcohol, or a mixture or combination thereof. Further, the support material of a composition described herein, in some cases, can be water dispersible, including when immersed or contacted with water at a temperature of 20-30° C.

Compositions described herein also comprise a build material. As provided herein, the support material of a three-dimensionally printed article supports one or more layers of build material used in the fabrication of the article. Any build material not inconsistent with the objectives of the present disclosure may be used. In some embodiments, the build material comprises a curable material. The curable material can be present in the build material in any amount not inconsistent with the objectives of the present disclosure. In some cases, the curable material is present in an amount up to about 99% by weight, up to about 95% by weight, up to about 90% by weight, or up to about 80% by weight, based on the total weight of the build material. In some cases, a build material described herein comprises about 10-95 weight % curable material, based on the total weight of the build material. In some embodiments, a build material comprises about 20-80 weight % curable material, about 30-70 weight % curable material, or about 70-90 weight % curable material.

Moreover, any curable material not inconsistent with the objectives of the present disclosure may be used. In some cases, a curable material comprises one or more polymerizable components. A "polymerizable component," for reference purposes herein, comprises a component that can be polymerized or cured to provide a printed 3D article or object. Polymerizing or curing can be carried out in any manner not inconsistent with the objectives of the present disclosure. In some embodiments, for instance, polymerizing or curing comprises irradiating with electromagnetic radiation having sufficient energy to initiate a polymerization or cross-linking reaction. For instance, in some embodiments, ultraviolet (UV) radiation can be used.

Further, any polymerizable component not inconsistent with the objectives of the present invention may be used. In some embodiments, a polymerizable component comprises a monomeric chemical species, such as a chemical species having one or more functional groups or moieties that can react with the same or different functional groups or moieties of another monomeric chemical species to form one or more covalent bonds, such as in a polymerization reaction. A polymerization reaction, in some embodiments, comprises a free radical polymerization, such as that between points of unsaturation, including points of ethylenic unsaturation. In some embodiments, a polymerizable component comprises at least one ethyleneically unsaturated moiety, such as a vinyl group or allyl group. In some cases, a polymerizable component comprises an oligomeric chemical species capable of undergoing additional polymerization, such as through one or more points of unsaturation as described herein. In some embodiments, a polymerizable component comprises one or more monomeric chemical species and one or more oligomeric chemical species described herein. A monomeric chemical species and/or an oligomeric chemical species described herein can have one polymerizable moiety or a plurality of polymerizable moieties.

In some embodiments, a polymerizable component comprises one or more photo-polymerizable or photo-curable chemical species. A photo-polymerizable chemical species, in some embodiments, comprises a UV-polymerizable chemical species. In some embodiments, a polymerizable component is photo-polymerizable or photo-curable at wavelengths ranging from about 300 nm to about 400 nm. Alternatively, in some embodiments, a polymerizable component is photo-polymerizable at visible wavelengths of the electromagnetic spectrum.

In some cases, a polymerizable component described herein comprises one or more species of (meth)acrylates. As used herein, the term "(meth)acrylate" includes acrylate or methacrylate or mixtures or combinations thereof. In some cases, a polymerizable component comprises an aliphatic polyester urethane acrylate oligomer, a urethane (meth)acrylate resin, and/or an acrylate amine oligomeric resin. In some embodiments, a UV polymerizable or curable resin or oligomer can comprise any methacrylate or acrylate resin which polymerizes in the presence of a free radical photoinitiator, is thermally stable in an exposed state for at least one week at the jetting temperature and for at least 4 weeks in an enclosed state, and/or has a boiling point greater than the jetting temperature. In addition, in some cases, a polymerizable component has a flash point above the jetting temperature.

Urethane (meth)acrylates suitable for use in build materials described herein, in some embodiments, can be prepared in a known manner, typically by reacting a hydroxyl-terminated urethane with acrylic acid or methacrylic acid to give the corresponding urethane (meth)acrylate, or by reacting an isocyanate-terminated prepolymer with hydroxyalkyl acrylates or methacrylates to give the urethane (meth)acrylate. Suitable processes are disclosed, inter alia, in EP-A 114 982 and EP-A 133 908. The weight average molecular weight of such (meth)acrylate oligomers is generally in the range from about 400 to 10,000, or from about 500 to 7,000. Urethane (meth)acrylates are also commercially available from the SARTOMER Company under the product names CN980, CN981, CN975 and CN2901, or from Bomar Specialties Co. (Winsted, CT) under the product name BR-741. In some embodiments described herein, a urethane (meth)acrylate oligomer has a viscosity ranging from about 140,000 cP to about 160,000 cP at about 50° C. or from about 125,000 cP to about 175,000 cP at about 50° C. when measured in a manner consistent with ASTM D2983. In some embodiments described herein, a urethane (meth)acrylate oligomer has a viscosity ranging from about 100,000 cP to about 200,000 cP at about 50° C. or from about 10,000 cP to about 300,000 cP at about 50° C. when measured in a manner consistent with ASTM D2983.

In some embodiments, a polymerizable component comprises one or more low molecular weight materials, such as methacrylates, dimethacrylates, triacrylates, and diacrylates, which can be used in a variety of combinations. In some embodiments, for example, a polymerizable component comprises one or more of tetrahydrofurfuryl methacrylate, triethylene glycol dimethacrylate, 2-phenoxyethyl methacrylate, lauryl methacrylate, ethoxylated trimethylolpropane triacrylate, tricyclodecane dimethanol diacrylate, 2-phenoxyethylacrylate, triethylene glycol diacrylate, a monofunctional aliphatic urethane acrylate, polypropylene glycol monomethacrylate, polyethylene glycol monomethacrylate, cyclohexane dimethanol diacrylate, and tridecyl methacrylate.

Further, in some cases, a polymerizable component comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, polyethylene glycol, tripropylene glycol, ethoxylated or propoxylated neopentyl glycol, 1,4-dihydroxymethylcyclohexane, 2,2-bis (4-hydroxycyclohexyl)propane or bis(4-hydroxycyclohexyl)methane, hydroquinone, 4,4'-dihydroxybiphenyl, bisphenol A, bisphenol F, bisphenol S, ethoxylated or propoxylated bisphenol A, ethoxylated or propoxylated bisphenol F or ethoxylated or propoxylated bisphenol S.

In addition, a polymerizable component, in some embodiments, comprises one or more tri(meth)acrylates, such as 1,1-trimethylolpropane triacrylate or methacrylate, ethoxylated or propoxylated 1,1,1-trimethylolpropanetriacrylate or methacrylate, ethoxylated or propoxylated glycerol triacrylate, pentaerythritol monohydroxy triacrylate or methacrylate, and/or tris(2-hydroxy ethyl) isocyanurate triacrylate. A polymerizable component of a build material described herein can also comprise one or more higher functional acrylates or methacrylates such as dipentaerythritol monohydroxy pentaacrylate or bis(trimethylolpropane) tetraacrylate. In some embodiments, a (meth)acrylate of a build material has a molecular weight ranging from about 250 to 700.

In some cases, a polymerizable component comprises allyl acrylate, allyl methacrylate, methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate and n-dodecyl (meth)acrylate, 2-hydroxyethyl (meth)acrylate, 2- and 3-hydroxypropyl (meth)acrylate, 2-methoxyethyl(meth)acrylate, 2-ethoxyethyl (meth)acrylate and 2- or 3-ethoxypropyl (meth)acrylate, tetrahydrofurfuryl methacrylate, 2-(2-ethoxyethoxy)ethyl acrylate, cyclohexyl methacrylate, 2-phenoxyethyl acrylate, glycidyl acrylate, isodecyl acrylate, or a combination thereof.

Additional non-limiting examples of species of polymerizable components useful in some embodiments described herein include the following: isobornyl acrylate (IBOA), commercially available from SARTOMER under the trade name SR 506A; isobornyl methacrylate, commercially available from SARTOMER under the trade name SR 423A; and triethylene glycol dimethacrylate, commercially available from SARTOMER under the trade name SR 205.

Build materials described herein, in some embodiments, can further comprise one or more additives, such as one or more additives selected from the group consisting of photoinitiators, inhibitors, stabilizing agents, sensitizers, and combinations thereof. For example, in some embodiments, a build material further comprises one or more photoinitiators. Any photoinitiator not inconsistent with the objectives of the present disclosure can be used. In some embodiments, a photoinitiator comprises an alpha-cleavage type (unimolecular decomposition process) photoinitiator or a hydrogen abstraction photosensitizer-tertiary amine synergist, operable to absorb light preferably between about 250 nm and about 400 nm or between about 300 nm and about 385 nm, to yield free radical(s).

Examples of alpha cleavage photoinitiators are Irgacure 184 (CAS 947-19-3), Irgacure 369 (CAS 119313-12-1), and Irgacure 819 (CAS 162881-26-7). An example of a photosensitizer-amine combination is Darocur BP (CAS 119-61-9) with diethylaminoethylmethacrylate.

In some embodiments, suitable photoinitiators comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, for example 2,4,6-trimethylbenzoyldiphenylphosphine oxide (Lucirin TPO), benzophenones, such as benzophenone and 4,4'-bis(N,N'-dimethylamino)benzophenone, thioxanthones and xanthones, acridine derivatives, phenazine derivatives, quinoxaline derivatives or 1-phenyl-1,2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

In some embodiments, suitable photoinitiators comprise those operable for use with a HeCd laser radiation source, including acetophenones, 2,2-dialkoxybenzophenones and 1-hydroxyphenyl ketones, such as 1-hydroxycyclohexyl phenyl ketone or 2-hydroxyisopropyl phenyl ketone (=2-hydroxy-2,2-dimethylacetophenone). Additionally, in some embodiments, suitable photoinitiators comprise those operable for use with an Ar laser radiation source including benzil ketals, such as benzil dimethyl ketal. In some cases, a photoinitiator comprises an α-hydroxyphenyl ketone, benzil dimethyl ketal or 2,4,6-trimethylbenzoyldiphenylphosphine oxide or a mixture thereof.

Another class of suitable photoinitiators, in some instances, comprises ionic dye-counter ion compounds capable of absorbing actinic radiation and generating free radicals for polymerization initiation. In some embodiments, build materials containing ionic dye-counter ion compounds can be cured more variably with visible light within the adjustable wavelength range of about 400 nm to about 700 nm. Ionic dye-counter ion compounds and their mode of operation are disclosed in EP-A-0 223 587 and U.S. Pat. Nos. 4,751,102; 4,772,530; and 4,772,541.

A photoinitiator can be present in a build material described herein in any amount not inconsistent with the objectives of the present disclosure. In some embodiments, a photoinitiator is present in a build material in an amount of up to about 5 weight percent, based on the total weight of the build material. In some embodiments, a photoinitiator is present in an amount ranging from about 0.1 weight percent to about 5 weight percent.

In some embodiments, a build material further comprises one or more sensitizers. A sensitizer can be added to a build material to increase the effectiveness of one or more photoinitiators that may also be present. Any sensitizer not inconsistent with the objectives of the present disclosure may be used. In some embodiments, a sensitizer comprises isopropylthioxanthone (ITX). In other cases, a sensitizer comprises 2-chlorothioxanthone (CTX).

A sensitizer can be present in a build material in any amount not inconsistent with the objectives of the present disclosure. In some embodiments, a sensitizer is present in an amount ranging from about 0.1 weight percent to about 2 weight percent or from about 0.5 weight percent to about 1 weight percent, based on the total weight of the build material.

A build material of a composition described herein, in some embodiments, further comprises one or more polymerization inhibitors or stabilizing agents. A polymerization inhibitor can be added to a build material to provide additional thermal stability to the composition. Any polymerization inhibitor not inconsistent with the objectives of the present disclosure may be used. In some embodiments, a polymerization inhibitor comprises methoxyhydroquinone (MEHQ). As described above, a stabilizing agent can comprise one or more anti-oxidants such as an aryl compound such as BHT.

A polymerization inhibitor and/or a stabilizing agent can be present in a build material in any amount not inconsistent with the objectives of the present disclosure. In some embodiments, a polymerization inhibitor or a stabilizing agent is present in an amount ranging from about 0.1 weight percent to about 5 weight percent, from about 0.1 weight percent to about 2 weight percent, from about 0.5 weight percent to 1 weight percent, or from about 0.5 weight percent to about 4 weight percent, based on the total weight of the build material.

Build materials described herein can also exhibit a variety of other desirable properties. For example, a build material described herein can have any freezing point, melting point, and/or other phase transition temperature not inconsistent with the objectives of the present disclosure. In some embodiments, a build material has a freezing or melting point consistent with temperatures used in some 3D printing systems, including 3D printing systems designed for use with phase changing build materials. In some embodiments, the freezing point of a build material is greater than about 40° C. In some cases, for example, a build material has a freezing point centered at a temperature ranging from about 45° C. to about 55° C. or from about 50° C. to about 80° C. In other instances, a build material has a freezing point below about 40° C. or below about 30° C.

Further, in some embodiments described herein, a build material exhibits a sharp freezing point or other phase transition. In some cases, a build material freezes over a narrow range of temperatures, such as a temperature range of about 1° C. to about 10° C., about 1° C. to about 8° C., or about 1° C. to about 5° C. In some embodiments, a build material having a sharp freezing point freezes over a temperature range of X±2.5° C., where X is the temperature at which the freezing point is centered (e.g., X=65° C.).

In addition, a build material described herein, in some embodiments, is fluid at jetting temperatures encountered in 3D printing systems. Moreover, in some cases, a build material solidifies once deposited on a surface during the fabrication of a three-dimensionally printed article or object. Alternatively, in other embodiments, a build material remains substantially fluid upon deposition on a surface. Solidification of a build material, in some cases, occurs through a phase change of the build material, such as freezing. The phase change, in some embodiments, comprises a liquid to solid phase change or a liquid to semi-solid phase change. In some embodiments, solidification of a build material comprises an increase in viscosity, such as an increase in viscosity from a low viscosity state to a high viscosity state, as described further hereinbelow.

Further, a build material described herein can have a viscosity profile consistent with the requirements and parameters of one or more 3D printing systems. In some embodiments, for instance, a build material described herein has a viscosity ranging from about 8.0 cP to about 19.0 cP, from about 8.0 to about 13.5 cP, or from about 11.0 cP to about 14.0 cP at a temperature of about 65° C. when measured according to ASTM standard D2983. In other instances, a build material described herein has a viscosity ranging from about 8.0 cP to about 14.0 cP, from about 9.5 cP to about 12.5 cP, or from about 10.5 cP to about 12.5 cP at a temperature of about 80° C. In some cases, a build material has a viscosity ranging from about 8.0 cP to about 10.0 cP at a temperature of about 85-87° C.

Further, build materials described herein, in some embodiments, exhibit a combination of one or more desirable features. In some cases, for instance, a build material in the non-cured state has one or more of the following properties:
1. Freezing point between about 30° C. and about 65° C.;
2. jetting viscosity of about 8 cP to about 16 cP at 70-95° C.; and
3. Thermal stability for at least 3 days at the jetting temperature. Viscosity can be measured according to ASTM D2983 (e.g., using a Brookfield Model DV-II+ Viscometer). In addition, for reference purposes herein, a thermally stable material exhibits no greater than about a 35 percent change in viscosity over a specified time period (e.g., 3 days) when measured at the specified temperature (e.g., a jetting temperature of 85° C.) at the beginning and at the end of the time period. In some embodiments, the viscosity change is no greater than about 30 percent or no greater than about 20 percent, or between about 10 percent and about 20 percent or between about 25 percent and about 30 percent. Moreover, in some embodiments, the change in viscosity is an increase in viscosity.

Moreover, a build material described herein in a cured state, in some embodiments, can exhibit one or more desired properties. A build material in a cured state, in some cases, comprises a build material that includes a curable material or polymerizable component that has been at least partially polymerized and/or cross-linked. For instance, in some embodiments, a cured build material is at least about 10% polymerized or cross-linked or at least about 30% polymerized or cross-linked. In some cases, a cured build material is at least about 50%, at least about 70%, at least about 80%, or at least about 90% polymerized or cross-linked. In some embodiments, a cured build material is between about 10% and about 99% polymerized or cross-linked. In some cases, when in the cured state, a build material described herein can have one or more of the following properties:
1. Tensile Strength of at least 2,000 psi;
2. Tensile Modulus of at least 100,000 psi;
3. Tensile elongation of at least 9%;
4. Hardness of at least 60 shore D;
5. Impact Strength of at least 0.2 ft-lb/in (Izod notched);
6. Flexural Strength of at least 1,500 psi; and
7. Flexural Modulus of at least 2,500 psi.

Build materials described herein, in some embodiments, can be produced in any manner not inconsistent with the objectives of the present disclosure. In some cases, for instance, a method for the preparation of a build material described herein comprises the steps of mixing the components of the build material, melting the mixture, and filtering the molten mixture. Melting the mixture, in some embodiments, is carried out at a temperature of about 75° C. or in a range from about 75° C. to about 85° C. In some embodiments, a build material described herein is produced by placing all components of the build material in a reaction vessel and heating the resulting mixture to a temperature ranging from about 75° C. to about 85° C. with stirring. The heating and stirring are continued until the mixture attains a substantially homogenized molten state. In general, the molten mixture can be filtered while in a flowable state to remove any large undesirable particles that may interfere with jetting. The filtered mixture is then cooled to ambient temperatures until it is heated in the 3D printer.

A three-dimensionally printed article described herein, in some embodiments, comprises a plurality of layers of the build material, wherein the layers of the build material are deposited according to data in a computer readable format. Moreover, at least one of the deposited layers of build material is supported by a support material described herein. The support material is removable to complete production of the three-dimensionally printed article or object of the composition.

III. Methods of Printing a 3D Article

In another aspect, methods of printing a 3D article or object are described herein. In some embodiments, a method of printing a 3D article comprises selectively depositing layers of a fluid build material to form the 3D article on a substrate, and supporting at least one layer of the build material with a support material, the support material comprising a support material described hereinabove in Section I. Any support material described in Section I may be used in a method described herein. For example, in some cases, the support material comprises a wax component and an ethoxylated polyethylene having the formula H—$(CH_2)_m$—$(OCH_2CH_2)_n$—OH, wherein m is an integer from 22 to 60 or from 30 to 40, and n is an integer from 2 to 200 or from 10 to 100. Additionally, in some embodiments, the phase change wax component and the ethyoxylated polyethylene are each present in the support material in an amount of 20-80% by weight or 40-60% by weight, based on the total weight of the support material. Moreover, in some instances, the support material of a method described herein further comprises a tackifier such as a rosin ester, a rosin alcohol, or a mixture or combination thereof. The support material of a method described herein, in some cases, can be water dispersible, including when immersed or contacted with water at a temperature of 20-30° C. Moreover, in some embodiments of methods of printing a 3D article, the build material can comprise any embodiment of a build material described hereinabove in Section II.

In addition, in some cases, a method of printing a 3D article described herein further comprises curing the build material. For example, in some embodiments, a method further comprises subjecting the build material to electromagnetic radiation of sufficient wavelength and intensity to cure the build material. A layer of deposited build material, in some instances, is cured prior to the deposition of another or adjacent layer of build material.

In some embodiments, a preselected amount of build material described herein is heated to the appropriate temperature and jetted through the print head or a plurality of print heads of a suitable 3D printer, such as a inkjet 3D printer, to form a layer onto a build support platform in a build chamber. Each layer of build material can be deposited according to the preselected computer assisted design (CAD) parameters. A suitable print head to deposit the build material, in one embodiment, is the piezoelectric Z850 print head. Additional suitable print heads for the deposition of build and support materials described herein are commercially available from a variety of ink jet printing apparatus manufacturers. For example, a Xerox print head or Ricoh print heads may also be used.

In some embodiments, the temperature of the build environment can be controlled so that the jetted droplets of build material solidify on contact with the receiving surface. In other cases, the jetted droplets of build material do not solidify on contact with the receiving surface, remaining in a substantially fluid state. In some embodiments, after each layer is deposited, the deposited material is planarized and cured with electromagnetic (e.g., UV) radiation prior to the deposition of the next layer. Optionally, several layers can be deposited before planarization and curing, or multiple layers can be deposited and cured followed by one or more layers being deposited and then planarized without curing. Planarization can correct the thickness of one or more layers prior to curing the material by evening the dispensed material to remove excess material and create a uniformly smooth exposed or flat up-facing surface on the support platform of the printer. In some embodiments, planarization is accomplished with a wiper device, such as a roller, which may be counter-rotating in one or more printing directions but not counter-rotating in one or more other printing directions. In some embodiments, the wiper device comprises a roller and a wiper that removes excess material from the roller. In some embodiments, the wiper device is heated. Further, it should be noted that the consistency of the jetted build material prior to curing can be sufficient to retain its shape and not be subject to excessive viscous drag from the planarizer. The foregoing process can be continued until a finished 3D article is prepared.

Moreover, the support material, in some embodiments, can be deposited in a manner consistent with that described herein for the build material. The support material, for example, can be deposited according to the preselected CAD parameters such that the support material is adjacent or continuous with one or more layers of the build material. Jetted droplets of the support material, in some embodiments, solidify or freeze on contact with the receiving surface, as described hereinabove. Additionally, in some cases, the deposited support material is also subjected to planarization. Layered deposition of the build material and support material can be repeated until the 3D article has been formed.

Moreover, in some embodiments, a method of printing a 3D article described herein further comprises removing the support material from the build material. As support materials described herein are water dispersible and/or at least partially water soluble, removing the support material from the build material, in some embodiments, comprises dispersing the support material in water. Dispersing the support material in water, in some cases, comprises contacting the support material with flowing water. In other instances, dispersing the support material in water comprises at least partially immersing the 3D article in a water bath. In some embodiments, the water bath is stirred, or sonicated, or otherwise agitated during immersion of the 3D printed article. Further, water used for the removal of a support material can be at any desired temperature not inconsistent with the objectives of the present disclosure. In some embodiments, water for the removal of the support material can be heated to any temperature that does not deform or substantially deform or compromise the structure of the build material of the 3D printed article. In some embodiments, for example, water for removal of the support material is heated to a temperature ranging from about 40° C. to about 70° C. Alternatively, in other cases, it is not necessary to heat the water used for removal of the support material. In some embodiments, for instance, the water for the removal of the support material is at a temperature at or near room temperature, such as a temperature ranging from about 20° C. to about 35° C. or about 20° C. to about 30° C.

In addition, in some cases, one or more surfactants or detergents can be added to water used to remove the support material from the build material. Alternatively, in other embodiments, no surfactants or detergents are intentionally added to the water.

Moreover, in some embodiments, a method of printing a 3D article described herein further comprises disposing of the support material dispersed and/or at least partially solubilized in water without further treatment. In some cases, an aqueous dispersion of a support material described herein can be disposed of in a wastewater treatment system without further chemical and/or physical processing prior to entry into the wastewater treatment system. In some embodiments, for example, an aqueous dispersion of a support material described herein can be disposed of in a municipal wastewater treatment system without further chemical and/or physical processing or treatment prior to entry into the municipal wastewater treatment system.

Some embodiments described herein are further illustrated in the following non-limiting examples.

EXAMPLES

Support Materials

Support materials according to some embodiments described herein were prepared as follows. Specifically, Support Materials 1 through 10 in Table I below were prepared by charging the components of each support material into a beaker, following by melting and stirring of the components at 110° C. All amounts in Table I are weights of the identified components in grams (g). Table II provides some properties of Support Materials 1-10. "DSC" in Table II refers to Differential Scanning calorimetry.

TABLE I

Support Material Compositions.

| Support Material | Stearyl alcohol[1] | Behenyl alcohol[2] | Ketone wax[3] | Ester wax[4] | Ethoxylated polyethylene[5] | Rosin ester[6] | Rosin alcohol[7] | Inhibitor[8] |
|---|---|---|---|---|---|---|---|---|
| 1 | 45.0 | | | | 45.0 | 10.0 | | |
| 2 | | 98.0 | | | 98.0 | | | 4.0 |

TABLE I-continued

Support Material Compositions.

| | | | | Components | | | | |
|---|---|---|---|---|---|---|---|---|
| Support Material | Stearyl alcohol[1] | Behenyl alcohol[2] | Ketone wax[3] | Ester wax[4] | Ethoxylated polyethylene[5] | Rosin ester[6] | Rosin alcohol[7] | Inhibitor[8] |
| 3 | | 88.0 | | | 88.0 | 20.0 | | 4.0 |
| 4 | | 44.0 | | | 44.0 | | 10.0 | 2.0 |
| 5 | | | 98.0 | | 98.0 | | | 4.0 |
| 6 | | | 88.0 | | 88.0 | 20.0 | | 4.0 |
| 7 | | | 44.0 | | 44.0 | | 10.0 | 2.0 |
| 8 | | | | 98.0 | 98.0 | | | 4.0 |
| 9 | | | | 88.0 | 88.0 | 20.0 | | 4.0 |
| 10 | | | | 44.0 | 44.0 | | 10.0 | 2.0 |

[1]Provided as 1-octadecanol from Sigma-Aldrich (Milwaukee, WI).
[2]Provided under the trade name NACOL 22-98 from Sasol North America, Inc. (Austin, TX).
[3]Provided under the trade name T-1 from Kao Corporation (Japan).
[4]Provided under the trade name PELEMOL BB from Phoenix Chemical, Inc. (Somerville, NJ).
[5]Provided under the trade name UNITHOX from Baker Petrolite (Barnsdall, OK).
[6]Provided under the trade name PINECRYSTAL KE-100 from Arakawa Chemical Industries, Ltd. (Japan).
[7]Provided under the trade name ARBITOL E from Eastman (Kingsport, TN).
[8]Provided as butylated hydroxytoluene (BHT) from Sigma-Aldrich (Milwaukee, WI).

TABLE II

Support Material Properties.

| Support Material | Viscosity at 110° C. (cPs) | Peak Melting Point by DSC (° C.) | Peak Freezing Point by DSC (° C.) | Suitable Jetting Temperature (° C.) |
|---|---|---|---|---|
| 1 | 7.97 | 56.6 | 51 | 100 |
| 2 | 8.99 | 69.5 | 61.6, 57.0 | 103 |
| 3 | 8.64 | 68.7 | 61.7, 57.5 | 101 |
| 4 | 12.27 | 67.4 | 59.9, 56.7 | 107 |
| 5 | 8.92 | 79.7 | 71.30 | 102 |
| 6 | 9.75 | 78.8 | 71.2 | 105 |
| 7 | 12.27 | 77.3 | 69.4 | 107 |
| 8 | 11.53 | 70.1 | 60.7 | 113 |
| 9 | 12.27 | 68.4 | 60.5 | 116 |
| 10 | 12.33 | 68.5 | 61.00 | 117 |

In addition to the properties provided in Table II, adhesion and water dispersion tests were carried out for some of Support Materials 1-10. Adhesion of the support materials to aluminum was evaluated by melting and solidifying the support materials in aluminum pans and then determining the adhesive strength by a peel test. Specifically, each support material was peeled off an aluminum pan and assigned a score of 1 to 5, where 1 corresponds to relatively weak adhesion and 5 corresponds to relatively strong adhesion. All tested support materials adhered to the aluminum pan and did not "pop off" the pan. In addition, Support Materials 1 and 2 were assigned an adhesion score of 3, while Support Material 8 was assigned a score of 4.

To evaluate the water dispersibility of support materials in room temperature water without agitation or the use of a detergent or surfactant, test samples were made by casting support material compositions in a silicone mold with a finished 3D printed part formed from a build material. Following casting, the test samples were immersed in water at about 25° C. in glass jars for several hours without agitation. The test samples were then removed from the water and inspected to determine how much of the support material was removed from the printed part and dispersed in water. Each of Support Materials 1-10 demonstrated a water dispersibility described hereinabove when evaluated in this manner.

The water dispersibility of some of Support Materials 1-10 was also evaluated with agitation. Specifically, test samples similar to those described above were prepared and then heated in an oven at 93° C. to melt and drain off the majority of the support materials adhered to the printed part. The resulting samples were then immersed in 100 mL water at 25° C. and shaken and evaluated every 30 minutes until all of the support material was removed from printed part. The time needed to remove the support material was recorded. Support Materials 2, 5, 6, and 8 exhibited removal times of 2-4 hours when evaluated in this manner.

In addition, the water dispersibility of some of Support Materials 1-10 was further evaluated with sonication (with ultrasound). Specifically, test samples were prepared by dipping finished 3D printed parts into the molten support materials. The resulting samples were permitted to cool and then were sonicated in a water bath to remove the support materials. The time needed to remove the support material was recorded. Support Materials 2, 3, 5, 6, 8, and 9 exhibited removal times of 1-2 hours when evaluated in this manner.

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed:

1. A method of printing a three-dimensional article comprising:
   selectively depositing layers of a fluid build material to form the three-dimensional article on a substrate;
   supporting at least one of the layers of the build material with a support material, the support material comprising a wax component and an ethoxylated polyethylene having the formula H—$(CH_2)_m$—$(OCH_2CH_2)_n$—OH, wherein the support material comprises 20-80% by weight of the wax component, and
   wherein m is an integer from 22 to 60 and n is an integer from 2 to 200, the values of m and n being selected based on the wax component and permitting miscibility between the wax component and the ethoxylated polyethylene; and removing the support material from the build material by contacting the support material with water.

2. The method of claim 1, wherein the removing the support material comprises contacting the support material with water at a temperature of 20-30° C.

3. The method of claim 1, wherein the wax component is a phase change wax.

4. The method of claim 3, wherein support material comprises 40-60% by weight the wax component.

5. The method of claim 4, wherein the support material comprises 20-80% by weight the ethoxylated polyethylene.

6. The method of claim 3, wherein the phase change wax component comprises a ketone wax, an ester wax, an alcohol wax, an amide wax, a urethane wax, or a mixture or combination thereof.

7. The method of claim 3, wherein the phase change wax component comprises a ketone wax.

8. The method of claim 3, wherein the phase change wax component comprises an alcohol wax.

9. The method of claim 3, wherein the phase change wax component has a melting point centered from 40° C. to 110° C.

10. The method of claim 1, wherein the support material comprises 20-80% by weight the ethoxylated polyethylene.

11. The method of claim 1, wherein the support material comprises 40-60% by weight the ethoxylated polyethylene.

12. The method of claim 1, wherein m is an integer from 30 to 40.

13. The method of claim 1, wherein n is an integer from 10 to 100.

14. The method of claim 1, wherein the ethoxylated polyethylene is miscible with at least two of a ketone wax, an ester wax, an alcohol wax, and an amide wax at a temperature of 70-95° C.

15. The method of claim 1, wherein the ethoxylated polyethylene and the wax component are miscible at a temperature of 70-95° C.

16. The method of claim 1 further comprising 2-30% by weight a tackifier.

17. The method of claim 16, wherein the tackifier is present in the support material in an amount of 5-25% by weight, based on the total weight of the support material.

18. The method of claim 16, wherein the tackifier comprises a rosin ester, a rosin alcohol, or a mixture or combination thereof.

19. The method of claim 1, wherein the support material is dispersible in water at a temperature of 20-30° C.

20. The method of claim 1, wherein the support material is non-curable.

21. The method of claim 1, wherein:
the phase change wax comprises a ketone wax or an alcohol wax;
m is an integer from 30 to 40; and
the support material is dispersible in water at a temperature of 20-30° C.

22. The method of claim 1, wherein the support material further comprises at least one of an inhibitor and a stabilizing agent.

* * * * *